United States Patent
Cohen et al.

(10) Patent No.: US 11,054,515 B2
(45) Date of Patent: Jul. 6, 2021

(54) RADAR CLUSTERING AND VELOCITY DISAMBIGUATION

(71) Applicant: Zoox, Inc., Foster City, CA (US)

(72) Inventors: Joshua Kriser Cohen, Sunnyvale, CA (US); Yu Liu, Newark, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 254 days.

(21) Appl. No.: 16/019,067

(22) Filed: Jun. 26, 2018

(65) Prior Publication Data

US 2019/0391250 A1 Dec. 26, 2019

(51) Int. Cl.
*G01S 13/58* (2006.01)
*G01S 13/931* (2020.01)

(52) U.S. Cl.
CPC ............ *G01S 13/58* (2013.01); *G01S 13/931* (2013.01); *G01S 2013/9318* (2020.01)

(58) Field of Classification Search
CPC ........ G01S 13/58; G01S 13/87; G01S 13/931; G01S 2013/9316; G01S 2013/9318; G01S 2013/93185; G01S 2013/9319; G01S 2013/9323; G01S 2013/9324; G01S 2013/93271
See application file for complete search history.

(56) References Cited

U.S. PATENT DOCUMENTS

| 5,504,488 | A | 4/1996 | Henderson et al. |
| 7,218,271 | B2 | 5/2007 | Aker et al. |
| 9,995,819 | B1* | 6/2018 | Akhund ................. G01S 7/418 |
| 2008/0278365 | A1 | 11/2008 | Klein et al. |
| 2012/0050714 | A1 | 3/2012 | McConville et al. |
| 2014/0022110 | A1* | 1/2014 | Itohara ................. G01S 13/72 342/107 |
| 2016/0124089 | A1 | 5/2016 | Meinherz et al. |
| 2018/0120419 | A1* | 5/2018 | Bialer ................. G01S 13/726 |

(Continued)

FOREIGN PATENT DOCUMENTS

| CN | 102567986 A | 7/2012 |
| DE | 102011052815 A1 | 2/2012 |

(Continued)

OTHER PUBLICATIONS

The PCT Search Report and Written Opinion dated Oct. 17, 2019 for PCT Application No. PCT/US2019/039005, 10 pages.

(Continued)

*Primary Examiner* — Timothy A Brainard
(74) *Attorney, Agent, or Firm* — Lee & Hayes, P.C.

(57) ABSTRACT

Sensors, including radar sensors, may be used to detect objects in an environment. In an example, a vehicle may include multiple radar sensors that sense objects around the vehicle, e.g., so the vehicle can navigate relative to the objects. Data from a first of the radar sensors can be analyzed to determine a cluster representing an object. Data received from a second sensor (and additional sensors, as included) at substantially the same time can be analyzed to determine additional points to include in the cluster. In additional examples, the radar sensors can have a different interval, e.g., Doppler interval, and information about the points and the intervals can be used to determine a speed of the object relative to the vehicle.

20 Claims, 6 Drawing Sheets

(56) References Cited

U.S. PATENT DOCUMENTS

2018/0143298 A1   5/2018  Newman
2018/0329063 A1  11/2018  Takemoto et al.
2020/0158876 A1   5/2020  Karadeniz et al.

FOREIGN PATENT DOCUMENTS

EP      3012657      4/2016
WO   WO199737242   10/1997

OTHER PUBLICATIONS

The PCT Search Report and Written Opinion dated Mar. 5, 2020 for PCT Application No. PCT/US19/62558, 9 pages.

* cited by examiner

RADAR CLUSTERING AND VELOCITY DISAMBIGUATION

BACKGROUND

Planning systems utilize information associated with agents in an environment to determine actions relative to those agents. For example, some existing planning systems consider distances and/or velocities of agents when determining maneuvers for the vehicle to traverse through the environment. Conventional systems may rely on different types of data, including but not limited to radar, LiDAR, vision, and/or the like to determine information about the agent(s). However, conventional systems have required receiving the same sensor data, e.g., radar data, over multiple iterations to confidently characterize agent movement. For example, resolving Doppler ambiguity for radar scans may require multiple, successive scans of the same radar sensor to determine the correct speed of an object. Such iterative processes may result in increased processing time and/or decreased efficiency in identifying and/or characterizing agents that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
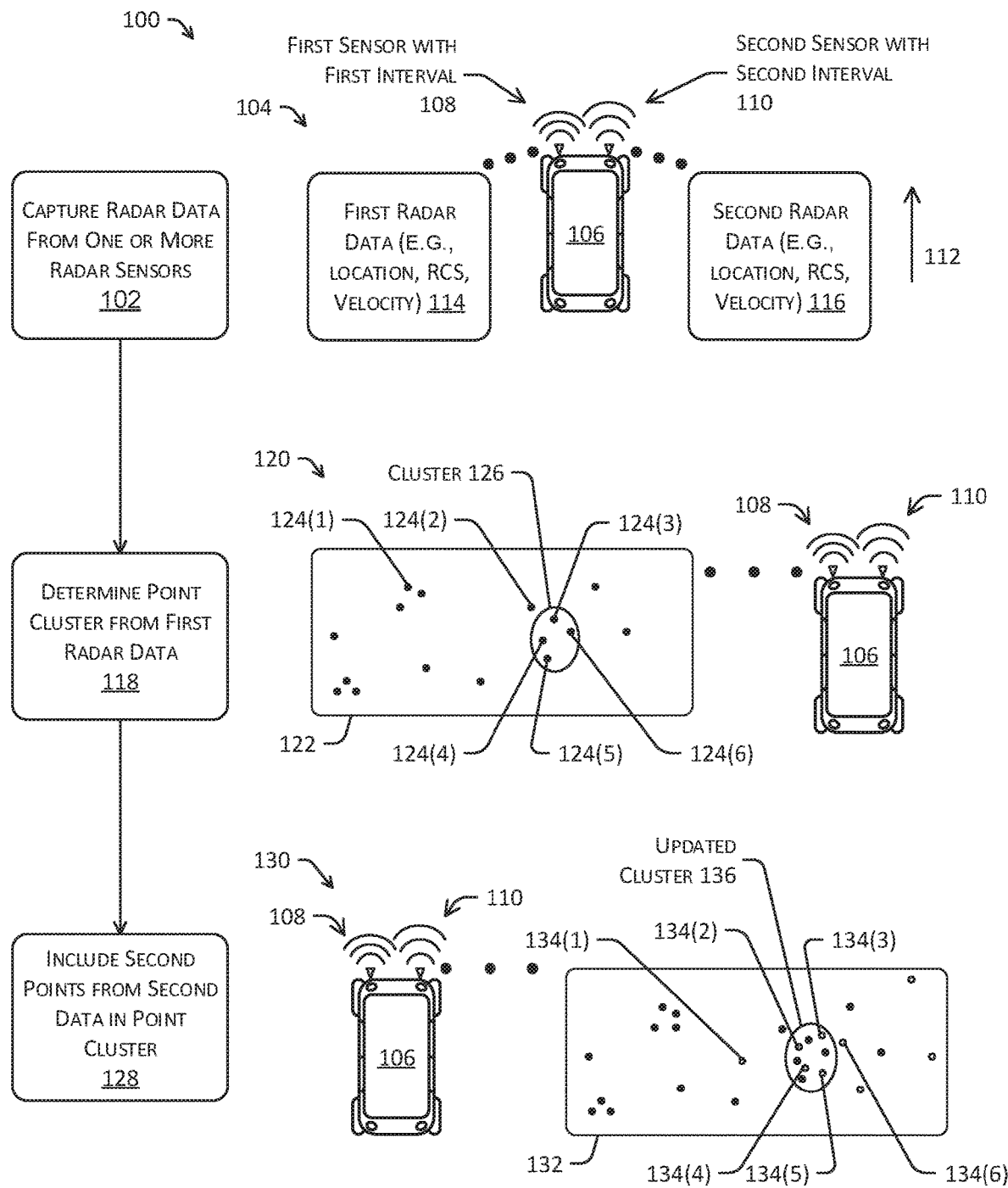
FIG. 1 includes textual and visual flowcharts to illustrate an example method for clustering radar data received from multiple radar sensors, as described herein.

Techniques described herein are directed to identifying features of objects in an environment based on sensor data. For example, in implementations described herein, point clustering techniques may be used to identify objects in sensor data, such as radar data, and/or disambiguation techniques may be used to determine a velocity of those objects. Although many systems may benefit from the techniques described herein, an example system that implements the clustering techniques and/or the disambiguation techniques may include an autonomous vehicle having multiple sensors (of the same modality and having a different read interval). In one such example the autonomous vehicle can include multiple sensors (of the same modalities), which can represent overlapping fields of view. A first sensor, e.g., a first Doppler radar sensor, can capture first sensor data, e.g. a radar scan (e.g., a collection of a number of measurements of radar returns as data points), of an environment and a second sensor, e.g., a second Doppler radar sensor, can capture second sensor data, e.g., a second radar scan (e.g., a second collection of measurements of radar returns as data points) of the environment. Each of the first scan and the second scan may return a number of points, each having associated information. Such information may include position information, e.g., a location of the point relative to the sensor, the vehicle, and/or in a coordinate system, signal strength information, e.g., a radar cross-section (RCS) value, or velocity information, e.g., a velocity of the point relative to the sensor.

In examples described herein, clustering techniques can be used to identify objects using the radar scans. For example, points in the first scan can be grouped according to any of the information received with the returns. By way of non-limiting example, points in a similar area, e.g., having close locational proximity, may be candidates for clustering as all being related to a single object. However, in other implementations, the signal strength information, RCS, the velocity information, and/or other information determined by the one or more sensors may also or alternatively be used to cluster points according to implementations of this disclosure. For example, the signal strength may be useful to differentiate between a person standing at a street corner and a light post upon which the person is leaning. Once a cluster is created from the first scan, points from the second scan may be determined for inclusion in the cluster. For instance, points in the second scan having similar characteristics, e.g., location, signal strength, velocity, may be added to the point cluster, to yield a robust representation of the sensed object. In at least some instances, these additional points from subsequent scans may be incrementally added to the existing clusters, as opposed to reclustering all of the points in accordance with the incremental clustering described herein.

According to implementations described herein, the scans may be nearly identical in time, e.g., within about 100 milliseconds, because the scans are coming from different sensors, but with overlapping fields of view. Moreover, although only two sensors are described in this example, in other examples, more sensors with overlapping fields of view may be used to further increase the number of points in the point cloud, thereby further strengthening the correlation between the point cluster and the detected object. In at least some examples, a single scan from a single radar device may comprise multiple subscans comprising scans at different frequencies, phase shifts, and the like. In such examples, each of the subscans may be treated equally, as overlapping scans from multiple radar. As such, techniques presented herein may be used with one or more sensors.

Implementations described herein may also use disambiguation techniques to disambiguate velocities associated with the points in the point cluster. In some examples, the sensors may be pulse-Doppler sensors with an associated Doppler interval, e.g., an interval within which velocities are read. Due to the periodic emission of radio waves in these sensors, however, the velocity reported for each of the points may not be the actual velocity. Instead, the velocity reported by the sensor may be a remainder of a modulus associated with the actual, or true, velocity of the point.

Conventionally, multiple, serial scans for a single sensor were required to disambiguate this velocity ambiguity. However, according to examples described herein, the ambiguity may be resolved in some instances using only the first scan and the second scan discussed above. As noted above, other examples comprise the use of multiple subscans of a single sensor. More specifically, in implementations of this disclosure, the first scan (or subscan) may be read at a first interval, e.g., a first Doppler interval, and the second scan (or subscan) may be read at a second interval, e.g., a second Doppler interval. When the intervals are sufficiently spaced, e.g., by equal to or more than about 2 m/s, techniques described herein can determine candidate velocities for one or more points in the first scan and for one or more points in the second scan, with a true velocity of the object corresponding to a candidate velocity of the one or more points in the first scan that corresponds to, e.g., is substantially equal to, a candidate velocity of the one or more points in the second scan.

In some examples, once the velocity of the object is determined, the computing device of the autonomous vehicle may determine one or more trajectories for proceeding relative to the object. In some instances, radar data generated according to techniques described herein may be combined, or fused, with data from other sensor modalities to determine the one or more trajectories.

Techniques described herein are directed to leveraging sensor and perception data to enable a vehicle, such as an autonomous vehicle, to navigate through an environment while circumventing objects in the environment. Techniques described herein can utilize information sensed about the objects in the environment, e.g., by multiple sensors, to more accurately determine point clusters that correspond to the objects. These point clusters may also be used to disambiguate velocity data, e.g., because the multiple sensors may have different intervals. For example, techniques described herein may be faster than conventional techniques, as they may alleviate the need for successive scans from a single sensor. That is, techniques described herein provide a technological improvement over existing object detection, classification, prediction and/or navigation technology. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which sensor ambiguity exists may benefit from the clustering and/or disambiguation techniques described. By way of non-limiting example, techniques described herein may be used on aircrafts, e.g., to identify and disambiguate velocities associated with objects in an airspace or on the ground. Moreover, non-autonomous vehicles could also benefit from techniques described herein, e.g., for collision detection and/or avoidance systems.

FIGS. 1-6 provide additional details associated with techniques described herein.

FIG. 1 depicts a pictorial flow diagram of an example process 100 for determining subsets of sensor data that are indicative of an object. In examples described herein, the sensor data may be obtained by radar sensors disposed on an autonomous vehicle. In this example, the process 100 uses multiple sensors with overlapping fields of view to determine point clusters indicative of objects in the environment of the autonomous vehicle.

At operation 102, the process can include capturing radar data from one or more radar sensors disposed on an autonomous vehicle. As will be appreciated from the disclosure herein, any number of radar sensors having overlapping fields of view can use the techniques described herein. An example 104 accompanying the operation 102 illustrates a vehicle 106 having a first radar sensor 108 and a second radar sensor 110 disposed on the vehicle 106. In the illustrated example, the vehicle 106 may be traversing through the environment generally in a direction indicated by an arrow 112 (although in other implementations, the vehicle 106 may be stationary or moving in a different direction), such that the first radar sensor 108 and the second radar sensor 110 are disposed on the leading end of the vehicle 106, e.g., to capture data about objects in front of the vehicle 106. More specifically, the first radar sensor 108 captures first radar data 114, e.g., via a first radar scan, and the second sensor captures second radar data 116, e.g., via a second radar scan. In the illustrated embodiment, the first and second radar sensors 108, 110 are generally configured next to each other, both facing in the direction of travel, and with significant overlap in their fields of view.

The first radar sensor 108 and the second radar sensor 110 may be radar sensors that measure the range to objects and/or the velocity of objects. In some example systems, the radar sensors may be Doppler sensors, pulse-type sensors, continuous wave frequency modulation (CWFM) sensors, or the like. For example, the radar sensors 108, 110 may emit pulses of radio energy at predetermined (and in some instances, configurable) intervals. In some implementations, the intervals may be configurable, e.g., to promote enhanced detection of objects at relatively far distances or relatively close distances. The pulses of radio energy reflect off objects in the environment and can be received by the radar sensors 108, 110, e.g., as the first radar data 114 and the second radar data 116. The frequency with which the radar returns are read out may also be configurable, in some examples.

In some example implementations, the first radar data 114 and/or the second radar data 116 may include position information indicative of a location of objects in the environment, e.g., a range and azimuth relative to the vehicle 106 or a position in a local or global coordinate system. The first sensor data 114 and/or the second sensor data 116 may also include signal strength information. For example, the signal strength information may be an indication of a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. In some instances, the signal strength may be a radar cross-section (RCS) measurement. The first sensor data 114 and/or the second sensor data 116 may also include velocity information. For instance, velocity of the object may be based on a frequency of radio energy reflected by the object and/or a time at which the reflected radio energy is detected. The first and second radar sensor data 114, 116 may also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc, or the like. In some implementations, certain types of the radar sensor data 114, 116 may be pre-configured, e.g., the field of view, the orientation, the PRF or PRI, or the like, in which case that data may be available to the autonomous vehicle 106 computing system, and may not be transferred with radar returns, for example.

At operation 118, the process 100 can determine one or more clusters from the first radar data 114. An example 120 accompanying the operation 118 includes a visualization 122 of the first radar data 114 for a first scan. More specifically, the visualization 122 includes a plurality of points which may be representative of objects in an environment of the sensor at a specific time. As illustrated, some of the points are labelled with reference numerals 124(1), 124(2), 124(3), 124(4), 124(5), 124(6) (hereinafter all of the points, whether or not labelled in FIG. 1, may be referred to, collectively, as "the points 124"). In the example, each of the points 124 may correspond to a radio wave detected at the first radar sensor 108, i.e., after reflecting off some object in front of the vehicle 106. In the visualization 122, the positions of the detected points 124 may generally correspond to a position of one or more detected objects, i.e., objects from which the emitted radio wave reflected. As will be appreciated, the radar sensors 108, 110 may receive and/or generate several types of information about the environment, so the visualization 122 could include more or less information; the visualization 122 is merely for explanatory purposes.

The visualization 122 illustrates that some of the points appear to be close in location, and as such, may be associated with a single object. For example, the points 124(2)-124(6) are closely situated, e.g., within a threshold distance, and in some instances those points may be estimated to be indicative of a single object. For example, the points 124(2)-124(6) could be identified as a point cluster. In examples described herein, a point cluster may include a plurality of points that have some likelihood, e.g., a level and/or degree of similarity, to identify a single object or grouping of objects that should be considered together, e.g., by a planning system of the autonomous vehicle. In aspects of this disclosure, information in addition to position information may be used to determine the point cluster 126. For example, while the points 124(2)-124(6) have similar positional returns, the point cluster 126 may only include the points 124(3)-124(6), because the point 124(2) may be representative of a different object than points 124(3), 124(4), 124(5) and 124(6). For instance, the signal strength, e.g., the RCS value, associated with the point 124(2) may be significantly different than the signal strength associated with the points 124(3), 124(4), 124(5), 124(6). In a real-world example, if a person is standing next to a fire hydrant, the returns from the fire hydrant could have a significantly stronger signal, e.g., because the fire hydrant is metal, than the returns from the person. Of course, it could be useful to differentiate between the person and the fire hydrant, as one may be more likely to move. Similar examples may include a person or animal next to a large truck, or the like. Thus, in the example of FIG. 1, the point 124(2) has been considered to be dissimilar enough from the points because of the disparate signal strength of the radio wave returned from the fire hydrant.

In other examples, other information may be used to include points in or exclude points from the point cluster 126. For example, when the radar sensor is a Doppler-type sensor, velocity of the objects may be used to determine the point cluster 126. In an example, when a bicyclist is riding next to a parked vehicle, it may be difficult to discern between the two objects based solely on location. Moreover, if both the bicycle and the vehicle have similar material composition, the signal strength of waves returned from both may be very similar. However, the velocities associated with the radar returns may be sufficiently different to allow for proper clustering of returns. More specifically, because the vehicle is stationary in this example, and the bicyclist is moving, points having a similar, non-zero velocity component can be clustered as the moving bicycle. Other information may also or alternatively be used to cluster points in accordance with the disclosure herein, and the examples provided are for illustration only.

According to the foregoing, as a result of the operation 118, the point cluster 126 is determined to include the points 124(3)-124(6). By using data in addition to, or instead of, position data, point clusters formed according to implementations of this disclosure may provide improved identification of objects detected by the first radar sensor 108. The point clusters 126 may be useful to the autonomous vehicle 106 to navigate through the environment relative to detected objects. The point cluster 126 may also benefit from the inclusion of points detected by the second radar sensor 110, e.g., in a second scan.

More specifically, at operation 128, the process 100 can include additional points, e.g., second points from second data, in the point cluster. An example 130 accompanying the operation 128 includes a visualization 132 of the second radar data 116, e.g., from a scan at the second radar sensor 110, along with the first points 124 representative of the first scan of the first radar sensor 108 (although for clarity in the visualization 132, the first points 124 are not labelled). The second radar data 116 is visualized as hollow circles, some of which are labelled with reference numerals 134(1), 134(2), 134(3), 134(4), 134(5), 134(6) (hereinafter all of the hollow points representative of the second sensor data 116, whether or not labelled in FIG. 1, may be referred to, collectively, as "the second points 134"). The second points 134 are representative of objects in the environment of the second sensor. In the example, each of the points 134 may correspond to a radio wave detected at the second radar sensor 110, i.e., after reflecting off some object in front of the vehicle 106. Because the fields of view of the first radar sensor 108 and the second radar sensor 110 overlap, the points 124 and the second points 134 may both represent objects in the overlapping fields of view. Moreover, in implementations of this disclosure, the scan of the second radar sensor 110 represented by the second sensor data 116 may be proximate in time with the first scan of the first radar sensor 108. As used herein, proximate time may be substantially identical in time according to a current state-of-the-art. However, because the first radar sensor 108 and the second radar sensor 110 may have different pulse intervals and/or different scanning intervals, the scans may not be exactly at the same time. In some examples, scans occurring within about 100 milliseconds may be considered to be proximate in time or substantially simultaneous.

As with the first points, the second sensor data 116 may include associated information for each of the second points 134. As with the points 124, this associated information may include position information, signal strength information, velocity information, and/or other information such as that discussed above. Techniques described herein may associate one or more of the second points 134 with the point cluster 126 to create an enlarged or updated point cluster 136. For example, in the illustrated embodiment, second points 134(2)-134(5) are indicated as being included in the updated cluster 136. In implementations described herein, the second points 134 may be included based on a proximity to already-clustered, e.g., in the cluster 126, points. For example, in implementations described herein, points in the second scan may be added to the cluster 126 when their distance, e.g., Euclidian distance, to a clustered neighbor is equal to or less than a threshold distance. Conceptually, one of the second points 134 may be included upon determining that a signal strength associated with that second point 134 falls between a minimum signal strength and a maximum signal strength of points already included in the cluster 126 or is close to the minimum or maximum. Inclusion may also be based on a proximity e.g., by location data, of each of the second points 134 to points already in the cluster 126 (e.g. a number of nearest neighbors (1, 2, or more)). Clustering may be performed based on any physical parameters associated with the points (including, but not limited to, velocities, signal strength, location, nearest neighbors, a time stamp the measurement was performed, etc.), as well as corresponding threshold differences in any of the aforementioned parameters. Inclusion may also be based on a combination of these and other information.

Accordingly, in implementations of this disclosure, an updated point cluster 136 may provide an improved representation of an object in the environment because the points may be clustered based on one or more diverse types of information, and because sensor data from multiple scans is used to create the cluster. In the example of FIG. 1, the point cluster 136 is created using sensor data from two radar sensors 108, 110. However, in alternate implementations of this disclosure, fewer or more sensors may be used. For example, a point cluster according to the foregoing techniques may be obtained for two scans (e.g., subscans as above) from the same sensor, e.g., in instances in which the scans are within a threshold time, e.g., 100 milliseconds or less. So long as the sensors are disposed to capture information about the same object, techniques for creating the updated point cluster 136 may be applied. Moreover, although the example implementation is discussed with reference to radar sensors, other sensor modalities, like sonar and/or LiDAR may also benefit from techniques described herein.

For illustration, the vehicle 106 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 106 can be configured to control all functions from start to stop, including all parking functions, it can be unoccupied. Additional details associated with the vehicle 106 are described below. However, the vehicle 106 is merely an example, and the systems and methods described herein can be incorporated into any ground-borne, airborne, or water-borne vehicle, including those ranging from vehicles that need to be manually controlled by a driver at all times, to those that are partially or fully autonomously controlled. In additional implementations, techniques described herein may be useful in settings other than vehicles. The techniques described in this specification may be useful in many different applications in which sensor data is used to determine information about objects in an environment.

Figure 2:
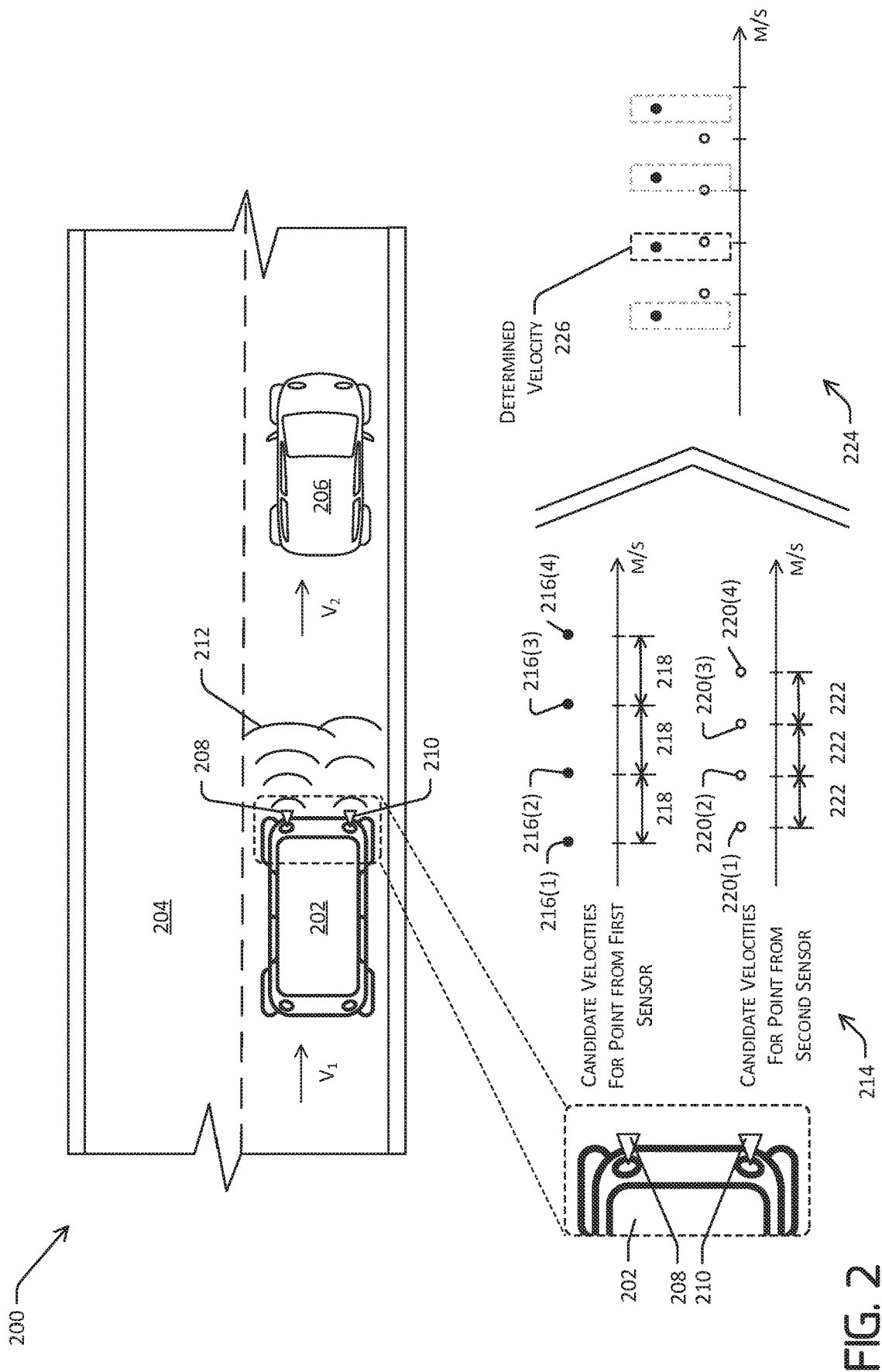
FIG. 2 is a schematic representation illustrating an example method for disambiguating sensor data, as described herein.

As described herein, the updated point cluster 136 may be useful to the autonomous vehicle 106 to identify objects, predict actions the objects may take, and/or maneuver in the environment relative to the objects, among other things. In some examples, the updated point cluster 136 may be used to further characterize the object represented by the cluster 136. FIG. 2 is used to illustrate an example.

FIG. 2 is a schematic illustration showing an example scenario 200 in which a vehicle 202, which may be substantially the same as the vehicle 106 detailed above, and described further herein, is driving on a road surface 204 at a first velocity, $V_1$. As also illustrated, the vehicle 202 is travelling on the road surface 204 behind a second vehicle 206. The second vehicle 206 is travelling at a second velocity, $V_2$.

The vehicle 202 has first and second sensors, e.g., a first radar sensor 208 and a second radar sensor 210. As illustrated, the first radar sensor 208 and the second radar sensor 210 are arranged to propagate waves generally in a direction of travel of the vehicle 202. Accordingly, emitted radio waves 212 will reflect off the second vehicle 206 and return to the radar sensors 208, 210 where they are detected via a radar scan. As also illustrated in FIG. 2, the radio waves 212 emitted by the first radar sensor 208 may be emitted at a different frequency, e.g. a pulse-regulated frequency, than the radio waves 212 emitted by the second radar sensor 210. Moreover, the radar sensors 208, 210 may also be configured differently, e.g., such that scans at the sensors 208, 210 have a different interval, e.g., a Doppler interval. In examples, features of the radar sensors 208, 210, including but not limited to the center frequency, the scan type, the scan pattern, frequency modulation, the pulse repetition frequency, pulse repetition interval, may be configured, e.g., to create the different Doppler intervals. Accordingly, the radar sensors 208, 210 are both disposed to sense objects generally in the same direction relative to the vehicle 202, but the radar sensors 208, 210 are configured differently.

The sensors 208, 210 may be similar to the radar sensors 108, 110 discussed above with reference to FIG. 1. Thus, the sensors 208, 210 may receive the reflected radio waves 212 and generate radar data therefrom. For instance, as with FIG. 1, the radar data may include diverse types of information, including but not limited to a velocity associated with each of many points representative of an object in the environment of the sensor. For example, when the sensors 208, 210 are pulse-Doppler sensors, the sensors 208, 210 may be able to determine a velocity of an object relative to the respective sensor.

However, depending upon the frequency at which the radio waves 212 are emitted and/or the scan rate of the sensors, returns from a single radar sensor may be insufficient to determine, with adequate certainty, a true velocity of the object relative to the radar sensor. More specifically, the pulse-Doppler radar system uses the Doppler effect to resolve velocity from a change in frequency caused by moving objects. Each radar scan also has a known Doppler interval. However, if the true speed of the object relative to the radar sensor is outside the Doppler interval, radar will report the modulus with respect to the Doppler interval. For example, using the scenario 200, assume the first sensor has a Doppler interval of [−15 m/s, 15 m/s], $V_1$ is 20 m/s, and $V_2$ is 4 m/s. The true relative velocity of the second vehicle 206 to the vehicle 202 is −16 m/s, but the radar sensor 208 will report a Doppler speed of 14 m/s, i.e., because 14 m/s is in the Doppler interval, whereas −16 m/s is outside the range. Accordingly, the reported 14 m/s is an ambiguous velocity, e.g., it could be a remainder of the modulus such that the velocity could be any interval of 30 m/s (i.e., because the Doppler interval is −15 m/s, 15 m/s]) from the reported Doppler velocity, including the correct reading of −16 m/s. Conventionally, this ambiguity may have been resolved by modulating the pulse repetition frequency of the emitted beams over time and comparing a series of resulting scans to disambiguate the velocity readings. However, as described herein, multiple scans that are substantially contemporaneous in time, e.g., scans (and/or subscans) from multiple sensors captured within a threshold time may be used to disambiguate the Doppler velocity more quickly and/or with increased accuracy. As will be appreciated, the threshold time may vary based on the application. For instance, a type of the sensors used, characteristics of the sensors used, object distance, or the like may impact the threshold time, however in implementations of this disclosure, the threshold time may be less than about 0.5 seconds and more preferably less than about 100 milliseconds. Timestamps from the sensor scans may be used to determine whether scans are within the threshold. In some instances, the threshold time may be determined as a part of the clustering (or association) performed. For example, the timestamp may be a single parameter of a sensor measurement used to cluster the one or more points and, in at least some instances, a threshold may be associated with the timestamps.

The ambiguity problem is illustrated in more detail in scenario 214 of FIG. 2. More specifically, because of the ambiguity described above, a velocity associated with a point sensed by the first sensor 208 during a scan will have a reported value, although that reported value may be a modulus corresponding to the true velocity. For example, the actual velocity may be any one of points 216(1), 216(2), 216(3), 216(4), each separated from the next by a Doppler interval 218 of the first sensor 208. For example, extending the example used above in which the Doppler interval is [−15 m/s, 15 m/s] and the speed determined by the radar system is 14 m/s, the point 216(1) may represent a velocity of −46 m/s, the point 216(2) may represent a velocity of −16 m/s, the point 216(3) may represent a velocity of 14 m/s and the point 216(4) may represent a velocity of 44 m/s. Although only four points 216(1)-216(4) are shown in FIG. 2, additional candidate velocities, i.e., velocities less than the velocity of the point 216(1) by an integer multiple of the Doppler interval 218 and/or velocities greater than the velocity of the point 216(4) by an integer multiple of the Doppler interval 218, may also be determined.

As also illustrated in the scenario 214, readouts from the second sensor 210 also are ambiguous. For example, a point corresponding to an object, such as the second vehicle 206, sensed by the second sensor 210 may be represented by any of the points 220(1), 220(2), 220(3), 220(4) which are separated by a Doppler interval 222 of the second sensor 210. While only the four points 220(1)-220(4) are shown for clarity, additional points, spaced from the illustrated points 220 by the Doppler interval may also be candidate velocities for the object.

the Doppler interval 222 of the second sensor 210 may be different from the Doppler interval 218 of the first sensor 208. Accordingly, and as illustrated in the example 224 of FIG. 2, the candidate points 216(1)-216(4) based on the first sensor 208 scan and the candidate points 220(1)-220(4) based on the second sensor 210 scan can be compared to resolve the ambiguity. More specifically, techniques described herein can disambiguate the Doppler velocity by comparing scans from different sensors to determine a common candidate for each of the scans. In the example illustrated, a determined velocity 226 is determined to be a velocity corresponding to the candidate velocity associated with the point 216(2) and the candidate velocity associated with the point 220(2). As illustrated by the grayed-out boxes associated with the points 216(1), 216(3), 216(4), candidate velocities for points sensed by the second sensor are not equal to any of the candidate velocities for the first sensor 208.

In example of FIG. 2, the velocity can be disambiguated because the points from the first scan and the second scan for which the candidate velocities are determined are associated with the same object, e.g., as determined by the clustering techniques described herein. In some examples, candidate velocities may be determined for any number of points associated with an object. For instance, candidate velocities may be determined for each of the points in the point cluster 136. Similarly, additional radar sensors may also be provided, and points from scans at the additional sensors may be considered in the same way. For example, a third radar sensor, having a third Doppler interval, may provide additional robustness.

Figure 3:
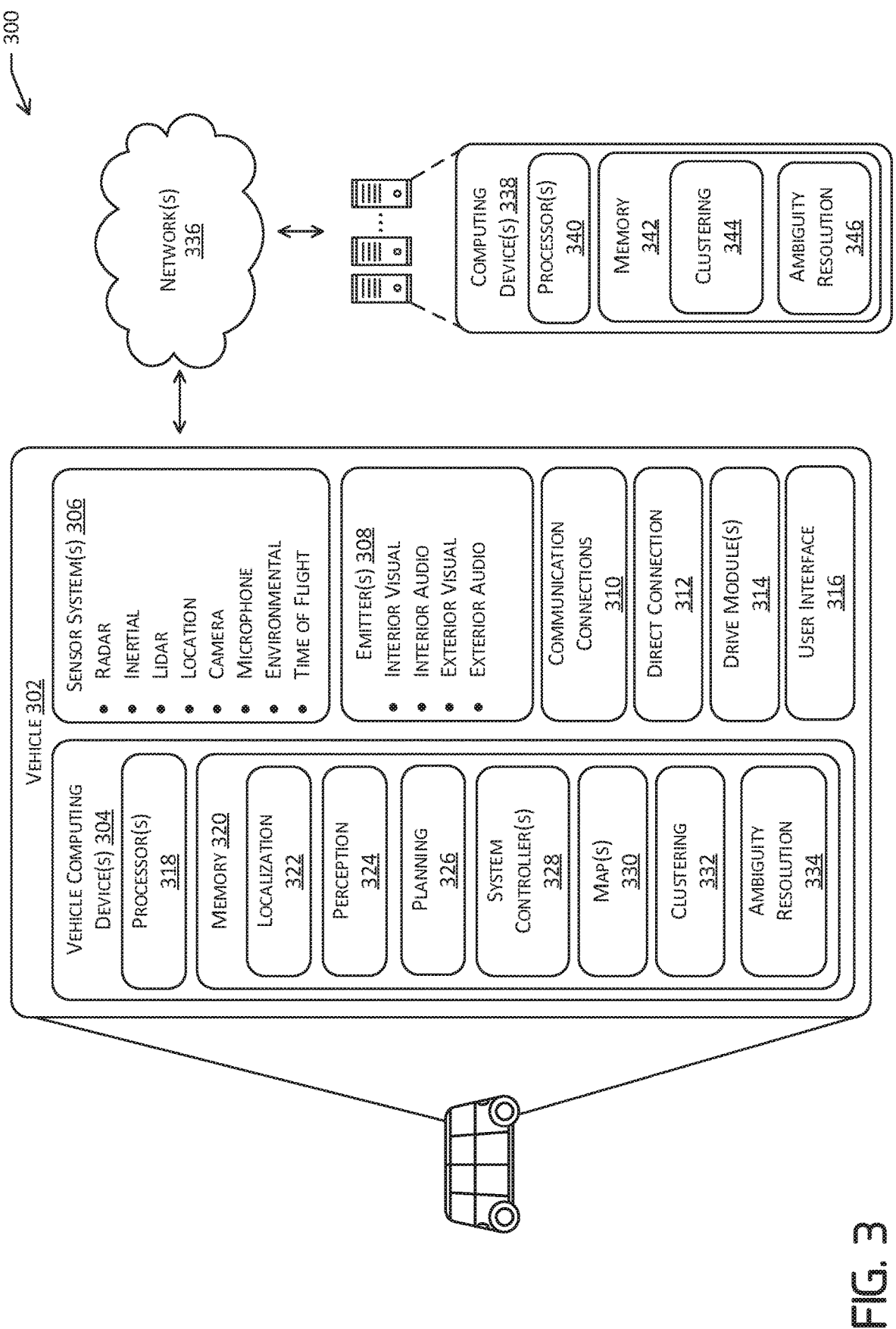
FIG. 3 is a block diagram illustrating an example computing system for generating clustering radar data and disambiguating sensor data, as described herein.

FIG. 3 illustrates a block diagram of an example system 300 for implementing the techniques described herein. In at least one example, the system 300 can include a vehicle 302, which can be the same vehicle as the vehicle 106 or the vehicle 202 described above with reference to FIGS. 1 and 2, respectively.

The vehicle 302 can include a vehicle computing device 304, one or more sensor systems 306, one or more emitters 308, one or more communication connections 310, at least one direct connection 312, one or more drive modules 314, and a user interface 316.

The vehicle computing device 304 can include one or more processors 318 and memory 320 communicatively coupled with the one or more processors 318. In the illustrated example, the vehicle 302 is an autonomous vehicle; however, the vehicle 302 could be any other type of vehicle. In the illustrated example, the memory 320 of the vehicle computing device 304 stores a localization component 322, a perception component 324, a planning component 326, one or more system controllers 328, one or more maps 330, a clustering component 332, and an ambiguity resolution component 334. Though depicted in FIG. 3 as residing in memory 320 for illustrative purposes, it is contemplated that the localization component 322, the perception component 324, the planning component 326, the one or more system controllers 328, the one or more maps 330, the clustering component 332, and/or the ambiguity resolution component 334 can additionally, or alternatively, be accessible to the vehicle 302 (e.g., stored on, or otherwise accessible by, memory remote from the vehicle 302).

In at least one example, the localization component 322 can include functionality to receive data from the sensor system(s) 306 to determine a position and/or orientation of the vehicle 302 (e.g., one or more of an x-, y-, z-position, roll, pitch, or yaw). For example, the localization component 322 can include and/or request/receive a map of an environment and can continuously determine a location and/or orientation of the autonomous vehicle within the map. In some instances, the localization component 322 can utilize SLAM (simultaneous localization and mapping), calibration, localization and mapping, simultaneously techniques, relative SLAM, bundle adjustment, non-linear least squares optimization, or the like to receive image data, LiDAR data, radar data, IMU data, GPS data, wheel encoder data, and the like to accurately determine a location of the autonomous vehicle. In some instances, the localization component 322 can provide data to various components of the vehicle 302 to determine an initial position of an autonomous vehicle for generating a candidate trajectory, as discussed herein.

In some instances, the perception component 324 can include functionality to perform object detection, segmentation, and/or classification. In some examples, the perception component 324 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 324 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. By way of non-limiting example, the perception component 324 may receive disambiguated velocities determined according to techniques described herein.

In general, the planning component 326 can determine a path for the vehicle 302 to follow to traverse through an environment. For example, the planning component 326 can determine various routes and trajectories and various levels of detail. For example, the planning component 326 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 326 can generate an instruction for guiding the autonomous vehicle along at least a portion of the route from the first location to the second location. In at least one example, the planning component 326 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In at least one example, the vehicle computing device 304 can include one or more system controllers 328, which can be configured to control steering, propulsion, braking, safety, emitters, communication, and other systems of the vehicle 302. These system controller(s) 328 can communicate with and/or control corresponding systems of the drive module(s) 314 and/or other components of the vehicle 302.

The memory 318 can further include one or more maps 330 that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LiDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 330 can include at least one map (e.g., images and/or a mesh). In some example, the vehicle 302 can be controlled based at least in part on the maps 330. That is, the maps 330 can be used in connection with the localization component 322, the perception component 324, and/or the planning component 326 to determine a location of the vehicle 302, identify objects in an environment, and/or generate routes and/or trajectories to navigate within an environment.

In some examples, the one or more maps 330 can be stored on a remote computing device(s) (such as the computing device(s) 338) accessible via network(s) 336. In some examples, multiple maps 330 can be stored based on, for example, a characteristic (e.g., type of entity, time of day, day of week, season of the year, etc.). Storing multiple maps 330 can have similar memory requirements, but increase the speed at which data in a map can be accessed.

The clustering component 332 can include functionality to cluster points, e.g. from radar scans, to better identify objects. For example, the clustering component 332 may receive sensor data comprising a plurality of points and information associated with the points. For example, the clustering component may receive position information, signal strength information, velocity information, or the like about points, and determine similarities between the points based on some or all of that information. For example, the clustering component 332 may determine points having close positional proximity and a signal strength within a threshold amount of neighboring points are indicative of an object and should be clustered.

In some implementations, the clustering component 332 may also consider points from a second scan to build the point cluster. For example, a second scan that is substantially simultaneous with the first scan would be expected to have similar returns for the same object. Accordingly, the clustering component may include points from the second scan to the cluster based on the criteria described herein. In some implementations, the clustering component may utilize algorithmic processing, e.g., DBSCAN, computer learning processing, e.g., K-means unsupervised learning, and/or additional clustering techniques The ambiguity resolution component 334 can include functionality to determine a velocity of objects in an environment of the vehicle 302. For instance, the ambiguity resolution component may include functionality to determine a velocity for a point cluster generated by the clustering component 332. For example, the ambiguity resolution component 334 may determine a plurality of candidate velocities for each point in a point cluster. In examples described herein, the velocity information determined by the sensor may be ambiguous, e.g., because of the scanning rate and/or the rate at which the sensor emits radio waves. For instance, candidate velocities for each point in a cluster may be a reported velocity of the cluster, e.g., a velocity with a Doppler interval associated with the sensor sensing the point and integer-multiples of the interval added to and/or subtracted from the reported velocity. When candidate velocities are determined for multiple points in a single cluster read by sensors having different intervals, the candidate velocities will overlap, e.g., be equal for points from each of the sensors, at the true velocity.

In at least one example, the sensor system(s) 306 can include LiDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, and as discussed herein, implementations of this disclosure may use multiple scans from multiple sensors, e.g., multiple radar sensors, with overlapping fields of view. Thus, for example, the autonomous vehicle 302 may include a number of radar sensors. In additional examples, the LiDAR sensors can include individual LiDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally, or alternatively, the sensor system(s) 306 can send sensor data, via the one or more networks 334, to the one or more computing device(s) at a particular frequency, after a lapse of a predetermined period of time, in near real-time, etc.

The vehicle 302 can also include one or more emitters 308 for emitting light and/or sound. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, one or more of the interior emitters may be used to signal to the passenger that the vehicle is approaching or has arrived at an unmapped region and that continued movement in the unmapped region will require permission and/or manual control. In addition, or alternatively, the interior emitters may alert the passenger(s) that a teleoperator or other external source (e.g., a passenger-in-waiting) has taken manual control of the vehicle 302. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. Moreover, the exterior emitters may be used to signal to a nearby entity that the vehicle is under manual control and/or to request an input for controlling, e.g., via the user device(s) 348.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote controllers.

The communications connection(s) 310 can include physical and/or logical interfaces for connecting the vehicle computing device 304 to another computing device or a network, such as network(s) 336. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive modules 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, radar sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 can provide a physical interface to couple the one or more drive module(s) 314 with the body of the vehicle 302. For example, the direction connection 312 can allow the transfer of energy, fluids, air, data, etc. between the drive module(s) 314 and the vehicle. In some instances, the direct connection 312 can further releasably secure the drive module(s) 314 to the body of the vehicle 302.

The user interface 316 may include one or more devices, buttons and/or control panels via which a passenger can communicate with the vehicle 302. In non-limiting examples, a passenger in the vehicle 302 may control functionality of the vehicle 302 via interaction(s) with the user interface 316. In other examples, the user interface 316 may comprise a microphone configured to receive a verbal or spoken input. Generally, the user interface 316 may provide a means though which a passenger can interface with the vehicle computing device(s) 304.

In at least one example, the vehicle 302 may be in communication, via one or more network(s) 336, with one or more computing device(s) 338. For example, as described herein, the vehicle 302 can communicate with the one or more computing device(s) 338 via the network(s) 336. In some examples, the vehicle 302 can receive control signals from the computing device(s) 236. In other examples, the vehicle 302 can transmit information to the computing device(s) 338.

The computing device(s) 338 may be embodied as a fleet management system. In at least one example, the computing device(s) 338 can include processor(s) 340 and memory 342 communicatively coupled with the processor(s) 340. In the illustrated example, the memory 342 of the computing device(s) 338 stores a clustering component 344 and an ambiguity resolution component 346. In at least one example, the clustering component 344 can correspond to at least a portion of the clustering component 332. For example, the clustering component 344 may receive radar data from multiple radar scans and determine point clusters representative of objects in the data. Moreover, the ambiguity resolution 346 can correspond to at least a portion of the ambiguity resolution component 334. For example, the ambiguity resolution component 346 may configure the computing device(s) 338 to determine object velocity based on Doppler intervals and point cluster information.

FIGS. 1, 4, 5, and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
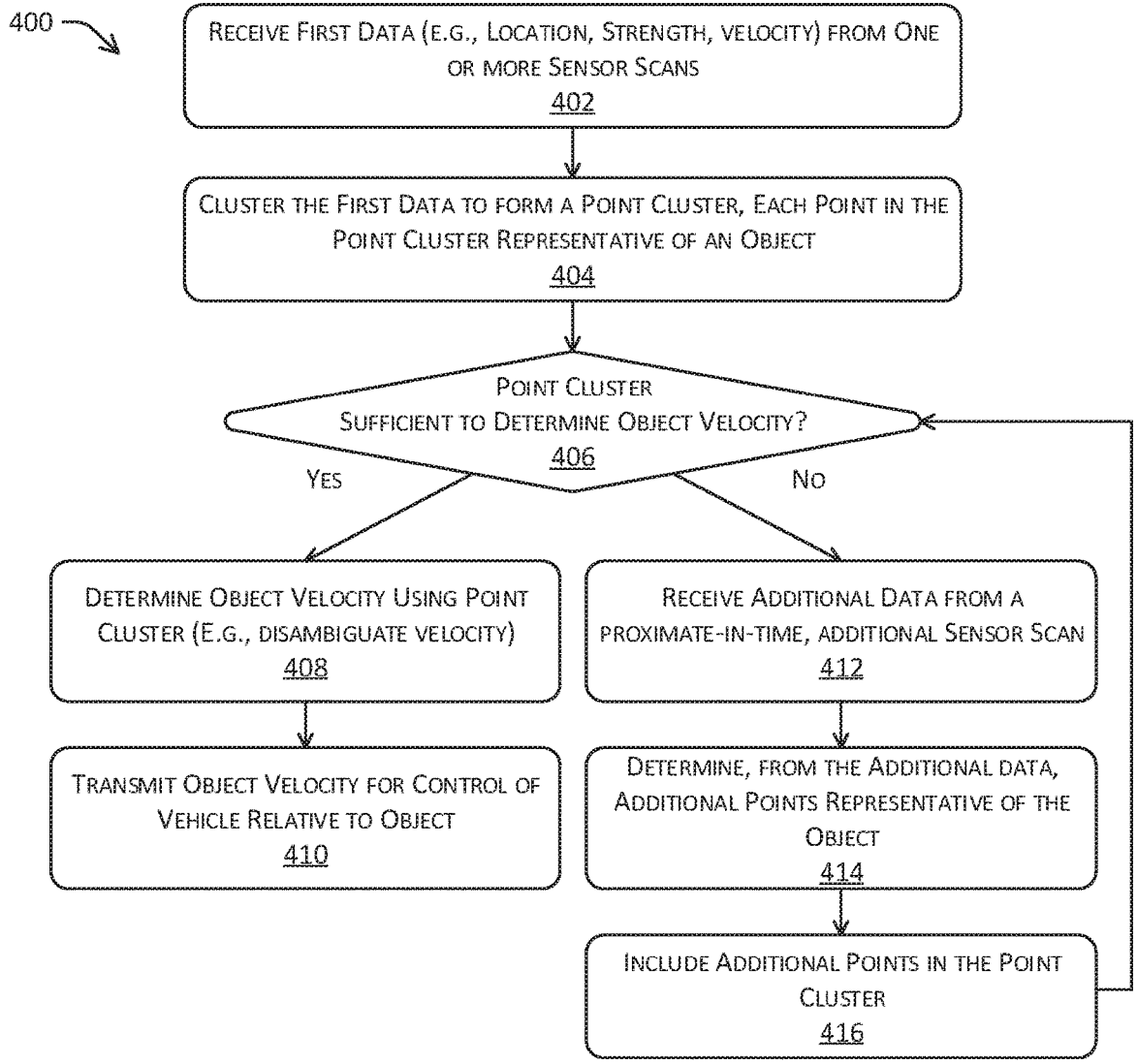
FIG. 4 is a flowchart illustrating an example method for clustering radar data, as described herein.

FIG. 4 depicts an example process 400 for clustering sensor data, such as radar data from multiple radar scans. For example, some or all of the process 400 can be performed by one or more components in FIG. 3, as described herein. For example, some or all of the process 400 can be performed by the clustering component 322 and/or the clustering component 344.

At operation 402, the process 400 can include receiving first data from one or more sensor scans. As described above, the vehicle 302 can include sensor system(s) 306. In at least one example, the sensor system(s) 306 can include LiDAR sensors, radar sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can provide input to the vehicle computing device(s) 304, and one or more systems of the vehicle computing device(s) 304 can utilize the input.

In specific examples of this disclosure, the clustering component 332 can receive the first data as radar data, e.g., from one or more radar scans (and/or subscans). The first data may be the first radar data 114 from the first radar sensor 108 disposed on the autonomous vehicle 106 or, in some instances, the first data can include both the first radar data 114 and the second radar data 116. As discussed in more detail above, the first radar data 114 may include information about radio waves emitted by the first radar 108 and detected by the first radar sensor 108 after being reflected off an object. By way of nonlimiting example, the first radar data 114 may include location information, signal strength information, velocity information, and/or the like.

At operation 404, the process 400 can include clustering the first data to form a point cluster. In examples described herein, each point in the point cluster may represent the same object in the environment. As noted with regard to operation 402, the first data may include various types of information about objects in the environment. At operation 404, points representative of the data received at operation 402 may be clustered according to this information. For example, points in a similar location, e.g., in a coordinate system, may be clustered. In other examples, additional information, such as signal strength or velocity may be used to identify a cluster of closely-related points, such as the cluster 126 in FIG. 1. In some implementations, clustering may be performed using algorithmic processing, e.g., DBSCAN, computer learning processing, e.g., K-means unsupervised learning, and/or additional clustering techniques.

At operation 406, the process 400 may determine whether the point cluster is sufficient to determine a velocity of the object represented by the cluster. For example, techniques described herein, including those described with reference to FIG. 2, may disambiguate velocity measurements from as few as two points so long as the points are read in different scans (or subscans) that have different Doppler intervals. Thus, for example, at operation 406, the process 400 may determine whether the point cluster includes two such points. The operation 406 may also determine whether the different Doppler intervals are sufficiently different. While a value of what constitutes "sufficiently different" may vary from application to application, e.g., based on the types of radar sensors used, the types of objects to be detected, configurations of the sensors, or the like, that phrase generally may be understood to mean that the intervals are sufficiently spaced to allow for disambiguation of the velocities. In additional examples, the operation 406 may determine whether the cluster at operation 404 is a true cluster, e.g., by determining a confidence level associated with cluster and/or the points in the cluster. Moreover, in some instances, which may include, for example, the point cluster representing an object that is relatively close to the vehicle 106, the presence of noise above a noise threshold, or some other reason(s), the operation 406 may determine that it may not be possible to determine the object velocity.

When, at operation 406, it is determined that the point cluster is sufficient to determine the object velocity, at operation 408, the process 400 determines the object velocity using the point cluster. Example 500, discussed below, is an example process for disambiguating radar velocities using points from scans that are proximate in time. As discussed herein, the velocity may be determined based on the velocity reported for the object during two scans, and intervals associated with the scans.

At operation 410, the process 400 may transmit the object velocity to control the vehicle relative to the object. For example, the operation 410 can include sending the object velocity (and other information about points in the point cluster) to one or more of a localization system (e.g., the localization component 320), a perception system (e.g., the perception component 322), and the like. In some instances, the velocity may be used by one or more systems of the vehicle to determine one or more trajectories through the environment and relative to the object.

If, at operation 406, it is determined that the point cluster is insufficient to determine the object velocity, at operation 412 the process 400 can include receiving additional data from an additional, proximate-in-time scan. For example, and with reference to FIG. 1, when the first data considered at operation 402 is the first radar data 114, the additional data received at operation 412 may be the second radar data 116 captured by the second radar sensor 110. For example, the second radar data 116 may be from a second radar scan captured at the second radar sensor 110 in close proximity in time to, e.g., substantially simultaneously with, a first radar scan at the first radar sensor 108. For example, the second scan may capture information within about 100 milliseconds of the first scan. In some implementations, when the first data considered at operation 402 includes the first radar data 114 and the second radar data 116, the additional data may include or more scans from another sensor and/or one or more additional scans (or subscans) from the first radar sensor 108 and/or the second radar sensor 110.

At operation 414, the process 400 can include determining, from the additional data, additional points representative of the object, and at operation 416, the process 400 can include the additional points in the cluster. For example, the operation 414 may consider position information, signal strength information, velocity information and/or other information to determine a correspondence of points from the second radar data 116 with points already in the cluster 126. For example, points at or below a threshold distance, e.g., a Euclidian distance based on position, signal strength, velocity, timestamp, number of nearest neighbors, etc., from points already in the cluster may be identified for inclusion in the cluster. And, the operation 416 may create the updated cluster using these newly identified points. In the example of FIG. 1, the updated cluster 136 may be formed by the inclusion of additional points from the second radar data 116 with the original cluster 126. Accordingly, the updated cluster 136 may include points from multiple scans, e.g., a first scan from a first radar sensor 108 and a second scan from a second radar sensor 110, or scans that are otherwise closely proximate in time (e.g., representative of substantially the same environment). In other implementations, it may be possible to obtain the two scans that are substantially close in time from a single sensor, e.g., from subscans, and determine the point cluster 126 according to implementations described herein.

At operation 422, the process 400 may transmit the object velocity for control the vehicle relative to the object. For example, the operation 422 can include sending the object velocity (and other information about points in the point cloud) to one or more a localization system (e.g., the localization component 320), a perception system (e.g., the perception component 422), and the like. In some instances, the velocity may be used by one or more systems of the vehicle to determine one or more trajectories through the environment and relative to the object.

Figure 5:
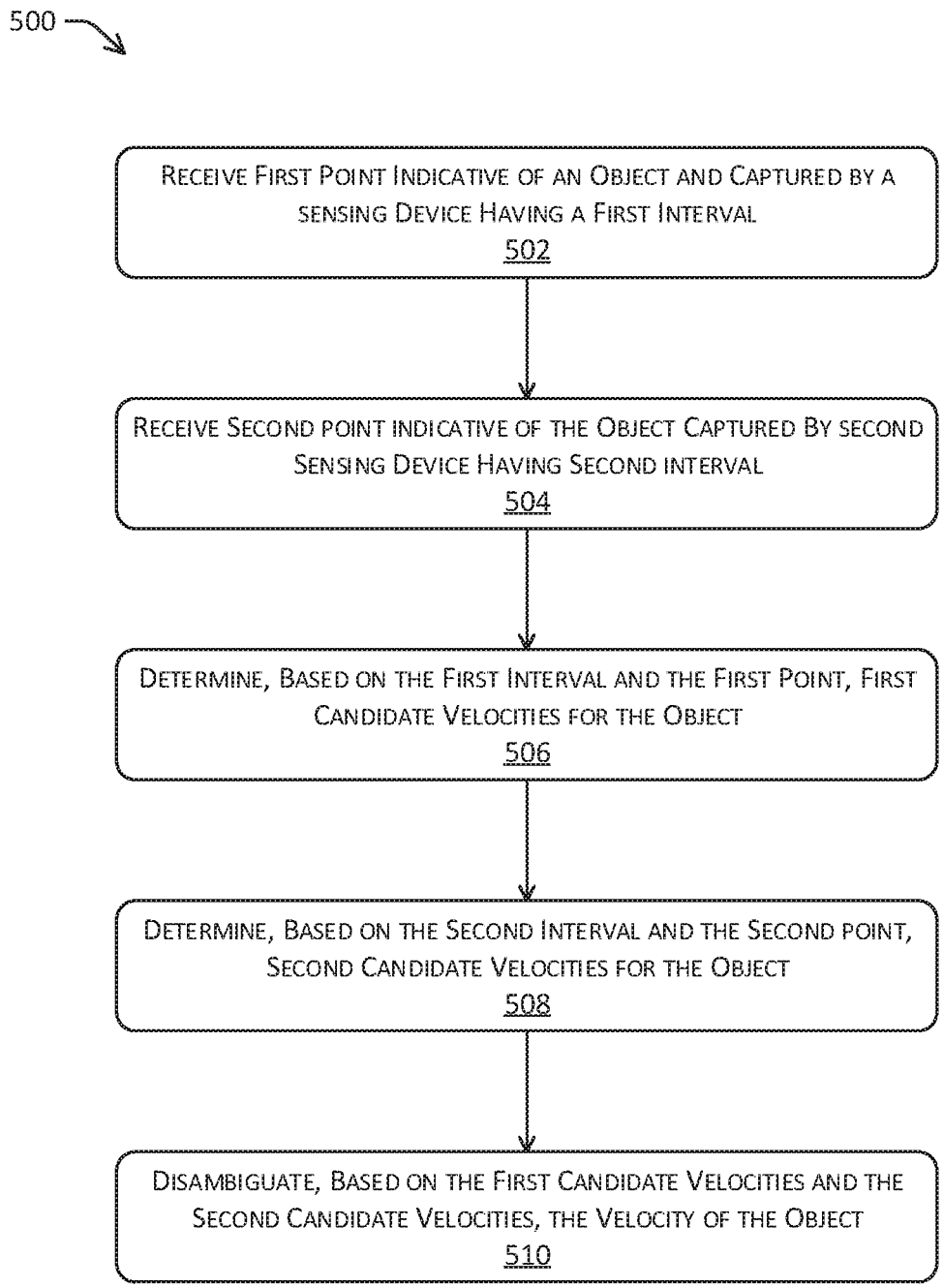
FIG. 5 is a flowchart illustrating an example method for disambiguating radar data, as described herein.

FIG. 5 depicts an example process 500 for disambiguating velocities, as discussed herein. In examples described herein, the process 500 may disambiguate Doppler velocities of points in a point cluster determined based on techniques described herein. In some examples, the process 500 may correspond to the operation 414 in the process 400, although the process 400 does not require the process 500 and the process 500 may have additional uses.

At operation 502, the process 500 receives a first point indicative of an object and captured by a sensing device having a first interval. For example, with reference to FIG. 1, the first point may be one of the first points 124 in the point cluster 126 and/or in the updated point cluster 136. The first point may include information about the object, including a velocity. When the sensor that senses the first point is a pulse-Doppler radar sensor, for example, the velocity may be a Doppler velocity of the object, e.g., relative to the vehicle 106 and read as a velocity in a Doppler interval of the sensor. As discussed with regard to FIG. 2, above, the Doppler velocity read by the sensor may be ambiguous, e.g., because it may represent a modulus associated with the actual velocity.

At operation 504, the process 500 includes receiving a second point indicative of the object captured by a second sensing device having a second interval. For example, and with reference to FIG. 1, the second point may be one of the second points 134 captured in a scan by the second radar sensor 110 in the point cluster 136. When the sensor that senses the second point is a pulse-Doppler radar sensor, for example, the velocity may be a Doppler velocity of the object, e.g., relative to the vehicle 106 and read as velocity in a Doppler interval of the second radar sensor 110. In this example, the Doppler interval of the second sensor will be different from the Doppler interval of the first sensor. For example, the Doppler interval of the second sensor may be at least 2 m/s larger or smaller than the Doppler interval of the first sensor.

At operation 506, the process 500 includes determining, based on the first interval and the first point, first candidate velocities for the object. For example, when the sensors 108, 110 are pulse-Doppler radar sensors, velocities of the points will be read as velocities in the Doppler interval of the sensor. As discussed above with reference to FIG. 2, the read velocity may be ambiguous, e.g., because it may be a remainder of a modulus of the actual velocity. Accordingly, at the operation 506, the process 500 may determine the candidate velocities for one of the points sensed by the first sensor 208 as the read velocity and one or more velocities offset from the read velocity by the Doppler interval of the first sensor 208. Examples of these candidate velocities are shown as the points 220(1), 220(2), 220(3), 220(4).

At operation 508, the process 500 includes determining, based on the second interval and the second point, second candidate velocities for the object. For example, when the sensors 108, 110 are pulse-Doppler radar sensors, velocities of the points will be read as velocities in the Doppler interval of the sensor. As discussed above with reference to FIG. 2, the velocity may be ambiguous because the read velocity may be a modulus associated with the actual velocity. Accordingly, at the operation 508, the process 500 may determine the candidate velocities for one of the points sensed by the second sensor 210 as the read velocity and one or more velocities offset from the read velocity by the Doppler interval of the second sensor 210. Examples of these candidate velocities are shown as the points 220(1), 220(2), 220(3), 220(4).

At operation 510, the process 500 can include disambiguating the velocity of the object based on the first candidate velocities and the second candidate velocities. For example, as illustrated in FIG. 2, the first candidate velocities and the second candidate velocities may be compared, with the candidate velocities that most closely align being the disambiguated velocity of the object. As will be understood, the velocity can be disambiguated in this manner because the points correspond to the same object, e.g., are from the same cluster. In some instances, the first candidate velocity and the second candidate velocity may not be exactly the same, in which case the operation 510 may include selecting the velocity of the object according to the closest candidates. For example, the operation 510 may include selecting the first candidate velocity or the second candidate velocity as the velocity of the object. In other embodiments, the operation 510 may average the first candidate velocity and the second candidate velocity, with the computed average being determined as the velocity of the object.

Although examples used to discuss FIG. 5 have included using one first point and one second point to determine the object velocity, other implementations may consider more points. For example, candidate velocities for each point in a point cluster, such as the point cluster 136, may be determined and compared. Moreover, although examples described herein generally describe using points from a first scan of a first sensor and points from a second scan of a second sensor, in some implementations the first scan and the second scan may be from the same radar sensor. For example, the Doppler interval of some sensors may be adjustable, such that successive scans may be read at different Doppler intervals. In this instance, however, the scans utilized may be within a very small period of time, e.g., no more than about 100 ms.

Figure 6:
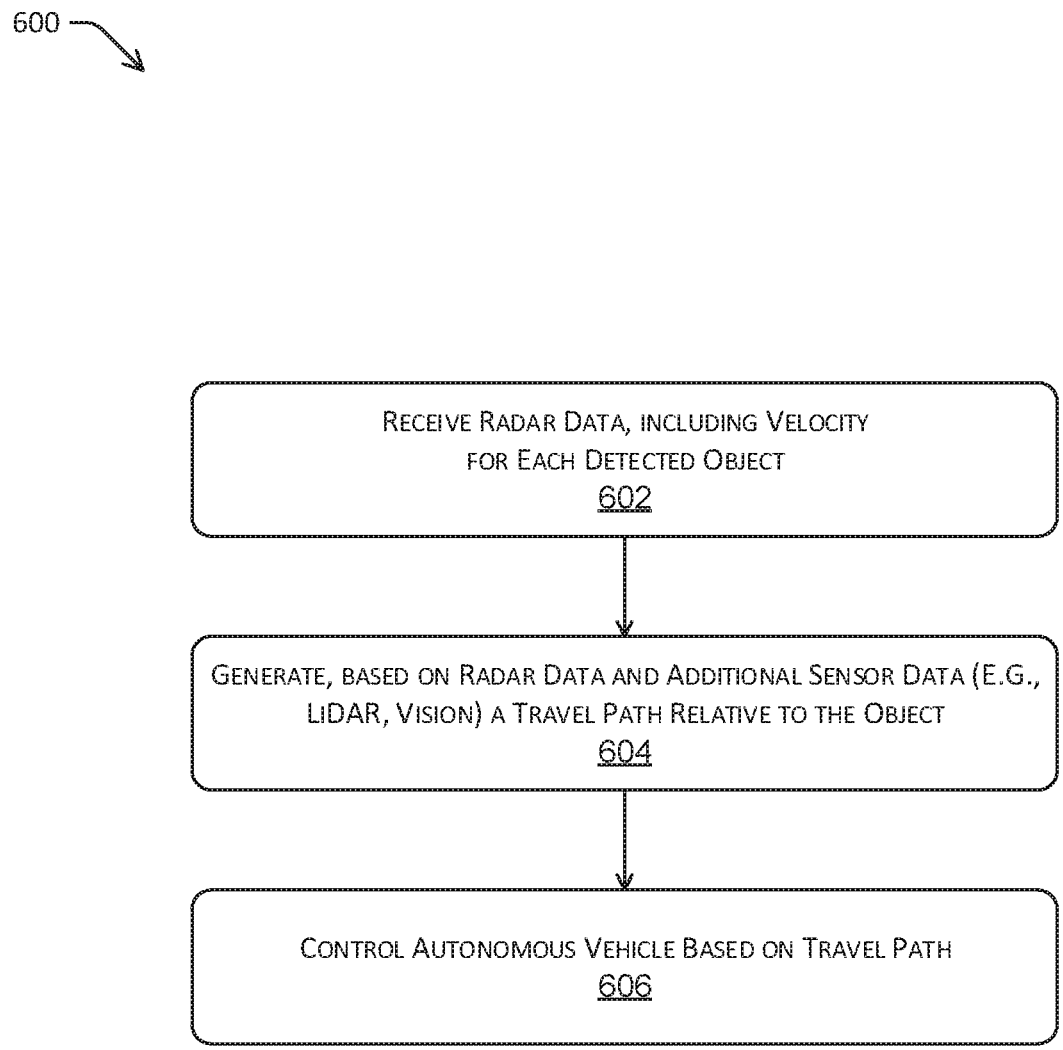
FIG. 6 is a flowchart illustrating an example method for controlling a vehicle, as described herein.

FIG. 6 depicts an example process 600 for controlling an autonomous vehicle based at least in part on object velocities, as discussed herein. For example, some or all of the process 600 can be performed by one or more components in FIG. 3, as described herein. For example, some or all of the process 600 can be performed by the localization component 320, the perception component 322, the planning component 324, and/or the one or more system controllers 326.

At operation 602, the process can include receiving radar data, including velocity for a detected object. In some instances, the detected object may be characterized by a point cluster determined using the clustering techniques described herein and/or the velocity of the object may be determined using the disambiguation techniques discussed herein.

At operation 604, the process 600 can include generating, based on the radar data and additional sensor data (e.g., LiDAR data, vision data), a travel path relative to the object. For example, the travel path generated in the operation 604 may be based at least in part on fused data including the radar data and data from one or more other sensors.

At operation 606, the process 600 can include controlling an autonomous vehicle to follow the travel path. In some instances, the commands generated in the operation 606 can be relayed to a controller onboard an autonomous vehicle to control the autonomous vehicle to drive the travel path. Although discussed in the context of an autonomous vehicle, the process 600, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: a first radar sensor on the vehicle, the first radar sensor having a first configuration and being configured to conduct first radar scans; a second radar sensor on the vehicle, the second radar sensor having a second configuration different from the first configuration and being configured to conduct second radar scans; one or more processors; and memory storing processor-executable instructions that, when executed by the one or more processors, configure the vehicle to: receive, from the first radar sensor, first radar data comprising a plurality of first points, each of the first points including first location information and first signal strength information; receive, from the second radar sensor, second radar data comprising a plurality of second points, each of the second points including second location information and second signal strength information; determine, based at least in part on the first radar data and the second radar data, a first subset of the plurality of first points and a second subset of the plurality of second points, the first subset and the second subset being indicative of an object proximate the vehicle; determine a first plurality of potential velocities of the object relative to the vehicle for a first point in the point cluster and a second plurality of potential velocities of the object relative to the vehicle for a second point in the point cluster; and resolve, based at least in part on the first plurality of potential velocities and the second plurality of potential velocities, a velocity of the object relative to the vehicle.

B: The vehicle of example A, wherein the plurality of first points correspond to a first scan of the first radar sensor taken at a first time and the plurality of second points correspond to a second scan of the second radar sensor taken at a second time, a difference between the first time and the second time being equal to or less than a threshold time.

C: The vehicle of example A or example B, wherein the instructions, when executed by the one or more processors, configure the vehicle to determine the velocity of the object based on the first scan and the second scan and exclusive of additional scans of the first radar sensor and additional scans of the second radar sensor.

D: The vehicle of any one of example A through example C, wherein: the first radar sensor is a Doppler radar sensor and the second radar sensor is a Doppler radar sensor, the first Doppler radar sensor has a first Doppler interval, the second Doppler radar sensor has a second Doppler interval, and a difference between the first Doppler interval and the second Doppler interval is equal to or greater than a threshold velocity difference, the first plurality of potential velocities are based at least in part on the first Doppler interval and the second plurality of potential velocities are based at least in part on the second Doppler interval, and the resolving comprises determining a first potential velocity of the first plurality of potential velocities that corresponds to a second potential velocity of the second plurality of potential velocities.

E: The vehicle of any one of example A through example D, wherein the instructions, when executed by the one or more processors, further configure the vehicle to: determine, based at least in part on the velocity of the object relative to the vehicle, a travel path through the environment relative to the object; and control the vehicle to travel along the travel path.

F: An example method includes: receiving first radar data associated with a first interval; receiving second radar data associated with a second interval; determining, from the first radar data, a first data point indicative of an object; determining, from the second radar data, a second data point indicative of the object; and determining, based at least in part on the first data point, the second data point, the first interval, and the second interval, a velocity of the object.

G: The method of example F, wherein the first radar data comprises a first radar scan acquired at a first time and the second radar data comprises a second radar scan acquired at a second time, wherein a difference between the first time and the second time is equal to or less than a threshold time.

H: The method of example F or example G, wherein the first radar data is acquired by a first radar sensor and the second radar data is acquired by a second radar sensor.

I: The method of any one of example F through example H, wherein the first radar scan and the second radar scan are acquired at a single radar sensor.

J: The method of any one of example F through example I, wherein the first radar sensor and the second radar sensor are Doppler radar sensors, the first interval and the second interval are Doppler intervals, and the first Doppler interval is different from the second Doppler interval by at least a threshold value. 0.11: The method of paragraph 6, wherein the determining the velocity of the object comprises: determining, for the first data point and based at least in part on the first interval, a plurality of first candidate velocities for the object; and determining, for the second data point of the one or more additional points and based at least in part on the second interval, a plurality of second candidate velocities for the object; wherein the velocity of the object corresponds to a first candidate velocity of the first plurality of candidate velocities that corresponds to a second candidate velocity of the second plurality of candidate velocities.

K: The method of any one of example F through example J, further comprising clustering the first radar data and the second radar data into one or more clusters, a cluster of the one or more clusters comprising the first data point and the second data point.

L: The method of any one of example F through example K, wherein the first radar data and the second radar data comprise at least one of position information, signal strength information, or velocity information, and clustering the first radar data and the second radar data is based at least in part on the at least one of the position information, the signal strength information, or the velocity information.

M: The method of any one of example F through example L, wherein the first radar data and the second radar data comprise signal strength information, the signal strength information comprising radar cross section measurements.

N: The method of any one of example F through example M, wherein the first radar data corresponds to a first scan of a first radar sensor and the second radar data corresponds to a second scan of a second radar sensor, the first scan and the second scan being proximate in time.

O: The method of any one of example F through example N, wherein the determining the velocity comprises determining the velocity of the object based on the first scan and the second scan, and exclusive of subsequent scans of the first radar sensor and subsequent scans of the second radar sensor.

P: An example non-transitory computer-readable medium has a set of instructions that, when executed, cause one or more processors to perform operations including: receiving, at a first Doppler interval, first radar data; receiving, at a second Doppler interval, second radar data; determining, based at least in part on the first radar data, a first data point indicative of an object; determining, based at least in part on the second radar data, a second data point indicative of the object; and determining, based at least in part on the first data point, the second data point, the first Doppler interval, and the second Doppler interval, a velocity of the object.

Q: The non-transitory computer-readable medium of example P, having further instructions that, when executed, cause the one or more processors to perform further operations comprising: determining, for the first data point and based at least in part on the first Doppler interval, a plurality of first candidate velocities for the object; and determining, for the second data point and based at least in part on the second Doppler interval, a plurality of second candidate velocities for the object; wherein the determining the velocity of the object comprises determining the velocity of the object as a first candidate velocity of the first plurality of candidate velocities that corresponds to a second candidate velocity of the second plurality of candidate velocities.

R: The non-transitory computer-readable medium of example P or example Q, wherein the first radar data corresponds to a first scan of the first radar sensor taken at a first time and the second radar data corresponds to a second scan of the second radar sensor taken at a second time, a difference between the first time and the second time being equal to or less than a threshold time.

S: The non-transitory computer-readable medium of any one of example P through example R, wherein the determining the velocity comprises determining the velocity of the object based on the first scan and the second scan, and exclusive of additional first scans of the first radar sensor and additional second scans of the second radar sensor.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
   a first radar sensor on the vehicle, the first radar sensor having a first configuration and being configured to conduct first radar scans;
   a second radar sensor on the vehicle, the second radar sensor having a second configuration different from the first configuration and being configured to conduct second radar scans;
   one or more processors; and
   memory storing processor-executable instructions that, when executed by the one or more processors, configure the vehicle to:
      receive, from the first radar sensor, first radar data comprising a plurality of first points, each of the first points including first location information and first signal strength information;
      receive, from the second radar sensor, second radar data comprising a plurality of second points, each of the second points including second location information and second signal strength information;
      determine, based at least in part on the first radar data and the second radar data, a first subset of the plurality of first points and a second subset of the plurality of second points, the first subset and the second subset being indicative of an object proximate the vehicle;
      determine a first plurality of potential velocities of the object relative to the vehicle for a first point in the point cluster and a second plurality of potential velocities of the object relative to the vehicle for a second point in the point cluster; and
      resolve, based at least in part on the first plurality of potential velocities and the second plurality of potential velocities, a velocity of the object relative to the vehicle.

2. The vehicle of claim 1, wherein the plurality of first points correspond to a first scan of the first radar sensor taken at a first time and the plurality of second points correspond to a second scan of the second radar sensor taken at a second time, a difference between the first time and the second time being equal to or less than a threshold time.

3. The vehicle of claim 2, wherein the instructions, when executed by the one or more processors, configure the vehicle to determine the velocity of the object based on the first scan and the second scan and exclusive of additional scans of the first radar sensor and additional scans of the second radar sensor.

4. The vehicle of claim 3, wherein:
   the first radar sensor is a Doppler radar sensor and the second radar sensor is a Doppler radar sensor,
   the first Doppler radar sensor has a first Doppler interval, the second Doppler radar sensor has a second Doppler interval, and a difference between the first Doppler interval and the second Doppler interval is equal to or greater than a threshold velocity difference,
   the first plurality of potential velocities are based at least in part on the first Doppler interval and the second plurality of potential velocities are based at least in part on the second Doppler interval, and
   the resolving comprises determining a first potential velocity of the first plurality of potential velocities that corresponds to a second potential velocity of the second plurality of potential velocities.

5. The vehicle of claim 1, wherein the instructions, when executed by the one or more processors, further configure the vehicle to:
   determine, based at least in part on the velocity of the object relative to the vehicle, a travel path through the environment relative to the object; and
   control the vehicle to travel along the travel path.

6. A method comprising:
   receiving first radar data associated with a first interval;
   receiving second radar data associated with a second interval;
   determining, from the first radar data, a first data point indicative of an object;
   determining, from the second radar data, a second data point indicative of the object; and
   determining, based at least in part on the first data point, the second data point, the first interval, and the second interval, a velocity of the object,
   wherein the first radar data comprises a first radar scan acquired at a first time and the second radar data comprises a second radar scan acquired at a second time, wherein a difference between the first time and the second time is equal to or less than a threshold time.

7. The method of claim 6, further comprising:
   determining, based at least in part on the velocity of the object, a travel path through the environment relative to the object; and
   controlling a vehicle to travel along the travel path.

8. The method of claim 6, wherein the first radar data is acquired by a first radar sensor and the second radar data is acquired by a second radar sensor.

9. The method of claim 8, wherein the first radar sensor and the second radar sensor are Doppler radar sensors, the first interval and the second interval are Doppler intervals, and the first Doppler interval is different from the second Doppler interval by at least a threshold value.

10. The method of claim 6, wherein the first radar scan and the second radar scan are acquired at a single radar sensor.

11. The method of claim 6, wherein the determining the velocity of the object comprises:
    determining, for the first data point and based at least in part on the first interval, a plurality of first candidate velocities for the object; and
    determining, for the second data point of the one or more additional points and based at least in part on the second interval, a plurality of second candidate velocities for the object;
    wherein the velocity of the object corresponds to a first candidate velocity of the first plurality of candidate velocities that corresponds to a second candidate velocity of the second plurality of candidate velocities.

12. The method of claim 6, further comprising clustering the first radar data and the second radar data into one or more clusters, a cluster of the one or more clusters comprising the first data point and the second data point.

13. The method of claim 6, wherein the first radar data and the second radar data comprise at least one of position information, signal strength information, or velocity information, and clustering the first radar data and the second radar data is based at least in part on the at least one of the position information, the signal strength information, or the velocity information.

14. The method of claim 13, wherein the first radar data and the second radar data comprise signal strength information, the signal strength information comprising radar cross section measurements.

15. The method of claim 6, wherein the first radar data corresponds to a first scan of a first radar sensor and the second radar data corresponds to a second scan of a second radar sensor, the first scan and the second scan being proximate in time.

16. The method of claim 15, wherein the determining the velocity comprises determining the velocity of the object based on the first scan and the second scan, and exclusive of subsequent scans of the first radar sensor and subsequent scans of the second radar sensor.

17. A non-transitory computer-readable medium having a set of instructions that, when executed, cause one or more processors to perform operations comprising:
receiving, at a first Doppler interval, first radar data;
receiving, at a second Doppler interval, second radar data;
determining, based at least in part on the first radar data, a first data point indicative of an object;
determining, based at least in part on the second radar data, a second data point indicative of the object; and
determining, based at least in part on the first data point, the second data point, the first Doppler interval, and the second Doppler interval, a velocity of the object,
wherein the first radar data comprises a first radar scan acquired at a first time and the second radar data comprises a second radar scan acquired at a second time, wherein a difference between the first time and the second time is equal to or less than a threshold time.

18. The non-transitory computer-readable medium of claim 17, having further instructions that, when executed, cause the one or more processors to perform further operations comprising:
determining, for the first data point and based at least in part on the first Doppler interval, a plurality of first candidate velocities for the object; and
determining, for the second data point and based at least in part on the second Doppler interval, a plurality of second candidate velocities for the object;
wherein the determining the velocity of the object comprises determining the velocity of the object as a first candidate velocity of the first plurality of candidate velocities that corresponds to a second candidate velocity of the second plurality of candidate velocities.

19. The non-transitory computer-readable medium of claim 17, further comprising clustering the first radar data and the second radar data into one or more clusters, a cluster of the one or more clusters comprising the first data point and the second data point.

20. The non-transitory computer-readable medium of claim 19, wherein the determining the velocity comprises determining the velocity of the object based on the first scan and the second scan, and exclusive of additional first scans of the first radar sensor and additional second scans of the second radar sensor.

* * * * *